United States Patent [19]

Smith et al.

[11] 4,347,149

[45] Aug. 31, 1982

[54] AQUEOUS BLEACH COMPOSITIONS

[75] Inventors: Eileen Smith, Chester; Doreen A. Timperley, Widnes; Dorothy M. Titchener, Chester, all of England

[73] Assignee: Interox Chemicals Limited, England

[21] Appl. No.: 245,140

[22] Filed: Mar. 18, 1981

[30] Foreign Application Priority Data

Apr. 1, 1980 [GB] United Kingdom ............... 8010886

[51] Int. Cl.$^3$ ............................................. C11D 7/54
[52] U.S. Cl. .................................... 252/102; 252/99;
252/186.29; 252/103; 252/104
[58] Field of Search .................. 252/98, 99, 102, 103, 252/104, 186

[56] References Cited

U.S. PATENT DOCUMENTS 3,607,760 9/1971 McIntyre ............................ 252/104
3,860,391 1/1975 Kling et al. .
4,238,192 12/1980 Kandathu ........................ 252/102 X

FOREIGN PATENT DOCUMENTS 2175922 10/1973 France .
2321302 3/1977 France .
1314694 4/1973 United Kingdom .
1348439 3/1974 United Kingdom .
1446971 8/1976 United Kingdom .
1451415 10/1976 United Kingdom .
1454192 10/1976 United Kingdom .

Primary Examiner—John E. Kittle
Assistant Examiner—Hoa Van Le
Attorney, Agent, or Firm—Larson and Taylor

[57] ABSTRACT

The present invention relates to aqueous alkaline bleach compositions containing hydrogen peroxide. Under alkaline conditions, it is particularly difficult to prevent the hydrogen peroxide decomposing excessively rapidly during storage, but the addition of an alkaline additive minimizes any change in the pH of washing solutions obtained by dissolution of generally bleach free washing compositions containing anionic surfactants. Hydrogen peroxide-containing aqueous alkaline bleach having acceptable peroxide stability can be obtained by employing an alcohol, preferably ethanol, in conjunction with a phosphonate, especially ethylene (diamino tetramethylene phosphonate,) particularly with a polyhydroxy carboxylate, preferably gluconate, or an amino acetate. The liquid bleach can contain a small proportion of a surfactant.

18 Claims, No Drawings

AQUEOUS BLEACH COMPOSITIONS

The present invention relates to aqueous bleach compositions, and more particularly to such compositions containing hydrogen peroxide as bleach.

For many years, it has been recognised that the washing performance of many anionic and non-ionic surfactants can be enhanced by employing in conjunction with them an active oxygen-containing compound such as hydrogen peroxide or salts which develop hydrogen peroxide in aqueous solution. It is necessary for the user to employ a separate bleach composition to achieve this objective when the washing composition does not contain an active oxygen-containing compound, i.e. a bleach. One convenient method of providing a separate bleach composition is in liquid form, but the usefulness of this method for providing hydrogen peroxide-containing liquid bleach has been hampered heretofore by a combination of conflicting requirements. On the one hand, it has long been recognised that an alkaline solution of peroxide exhibits very poor storage stability, especially in comparison with even mildly acid solutions. On the other hand, if a significant amount of an acidic solution is employed in conjunction with a conventional washing composition in order to form a dilute washing solution, then the solution is noticeably less alkaline than the case if the washing composition were employed on its own. Since, for any given washing composition, there is a relatively narrow range of pH's within which optimum washing performance occurs, the use of that washing composition in conjunction with the acidic aqueous hydrogen peroxide solution does not realise the full benefit of employing the bleaching agent.

It is an object of the present invention to provide an aqueous alkaline hydrogen peroxide-containing bleach composition for use in conjunction with a washing composition.

It is a further object of the present invention to provide in at least some embodiments, alkaline hydrogen peroxide-containing liquid bleach compositions having acceptable storage stability and a pH similar to that produced by the washing composition with which they are intended to be used.

According to the present invention, there is provided a liquid bleach composition comprising at least 3% hydrogen peroxide, at least 5% ethanol and in conjunction with the ethanol a stabilising amount of a compound selected from amino compounds substituted by acetate or methylene phosphonate groups and hydroxyalkyl diphosphonates, and water.

Preferably, the bleach composition has a pH within the range of from pH 8 to 9.5. It will be recognised that the change in pH in the solution by introduction of acidic bleach solution would be the greatest in those circumstances in which the wash solution would otherwise have a higher pH, i.e. pH of 9.0 or higher. The pH change caused by introduction of the bleach in such built anionic surfactant-based formulations can be eliminated to at least the considerable extent by selecting the stabilised bleach solution having a pH of at least pH 8.5 particularly a pH of at least 9.0.

The pH of the bleach composition can be brought to within the desired range by the addition of an appropriate amount of an alkali metal or ammonium base. Suitable bases include hydroxides, oxides, and borates. Particularly suitable bases include sodium and potassium hydroxide and sodium metaborate. The hydrogen peroxide in solution can be provided to at least a certain extent by dissolution of the addition product of hydrogen peroxide and alkali metal borate, preferably employing an addition product that is silicate-free, because silicate, although a stabiliser for solid per compounds, appears to act as a destabiliser in aqueous bleach solutions reducing the long term storage stability of the bleach composition. As an alternative to inorganic bases, organic ammonium or amine bases can be employed of which one particularly suitable base is triethanolamine.

We have found that the presence of the ethanol enhances the storage stability of the bleach mix. The amount of ethanol is normally within the range of 5 to 20% by weight. The stabiliser used in conjunction therewith is preferably used in an amount of at least 0.1% of the bleach composition, the amount often being selected within the range of from 0.1 to 0.4% of the composition. Suitable stabilisers include substituted amino compounds and hydroxyalkyl phosphonates. Many suitable substituted amino compounds can be represented by the general formula: $R + NR(CH_2)_p +_q - NR_2$
in which p is normally from 2 to 6 and q is normally from 0 to 2, and R represents an acetate or methylene phosphonate groups or corresponding acid group. Highly desirable examples are ethylene diamino tetra (methylene phosphonic acid) hexa potassium salt, and diethylene triamino penta (methylene phosphonic acid) hexa potassium salt, and ethylene diamino tetra acetic acid, tetrasodium salt. Further suitable examples include hexamethylene diamino tetra (methylene phosphonic acid), penta sodium salt and amino tri(methylene phosphonic acid) penta sodium salt. Where desired, one or more of the methylene groups linking the amino groups can be substituted at the carbon atom by a lower alkyl group or at one carbon only by an hydroxyl group or the substituents of two such suitably spaced, preferably adjacent carbon atoms can combine to form cycloaliphatic ring, preferably containing 5 to 6 carbon atoms.

The hydroxyalkyl diphosphonates can conveniently be represented in acid form by the formula $YZC(PO_3H_2)_2$ in which Y represents an hydroxyl or amino group, the amino group itself optionally being substituted by a lower alkyl, a lower alkylamino or a lower hydroxyalkyl group, lower indicating from 1 to 4 carbon atoms, and Z represents a lower alkyl, preferably methyl group. Examples of such diphosphonates include 1-amino ethane-1,1-diphosphonic acid and 1-hydroxyethane-1,1-diphosphonic acid, and preferably the alkali metal salts thereof. Mixtures of any two or more of the aforementioned amino-methylene phosphonates and/or diphosphonates and amino acetates can be employed, as desired.

Preferably, the phosphonate compound is used in addition in conjunction with a polyhydroxy carboxylate, and especially a sodium or potassium salt thereof. The polyhydroxy carboxylate preferably is an aliphatic compound containing from 5 to 9 carbon atoms, more preferably is linear and in many embodiments advantageously is a C6 or C7 linear compound and most desirably those in which all the non-carboxylate carbon atoms are substituted by an hydroxyl group. An especially convenient example of such compounds is sodium gluconate. The polyhydroxy carboxylate compounds are normally employed in a weight ratio to the phosphonate of from 3:1 to 1:3 and in practice the weight % of polyhydroxycarboxylate incorporated in the liquid bleach composition is often in the range of 0.1 to 0.4%.

The liquid composition of the present invention can additionally incorporate a small proportion of an anionic, non-ionic or amphoteric surfactant. The surfactant is normally incorporated in an amount of not more than 3% and often within the range of 0.5 to 2.5%. Suitable non-ionic surfactants include alcohol ethoxylates, the alkyl moiety derived from the alcohol group normally being either a primary or a secondary alkyl group, having a chain length generally of from 9 to 18 carbon atoms the weight proportion of ethoxylate in the non-ionic surfactant is preferably within the range of from 50 to 85% advantageously from 65 to 80%. In many preferred alcohol ethoxylates, the chain length of the alcohol group is in the range on average of from 11 to 15 and the degree of ethoxylation is in the range of 9 to 13. Alternatively, the corresponding fatty acid ester derivatives of polyester oxyethylene can be employed. It is possible to employ as an alternative, alkyl aryl polyoxyethylene ethers, in which preferably the degree of ethoxylation is in the range of from 9 to 13 and the alkyl substituent of the aryl preferably benzyl group is from 7 to 11 carbon atoms in length. However, since the alkyl aryl ethoxylates exhibit at best poor biodegradability, they are therefore less acceptable to water authorities than the corresponding wholly alkyl counterparts.

The anionic surfactants are preferably selected from anionic sulphate or sulphonate surfactants, including alkyl benzene sulophonates, secondary alkylene sulphonates, alpha olefin sulphonates, alcohol ether sulphates and sulphated derivates of alcohol ethoxylates. Each of the foregoing classes of anionic surfactants preferably contains an alkyl group of at least 9 carbon atoms in length and in many cases from 11 to 16 carbon atoms in length. By virtue of its ready availability and low cost, a linear alkyl benzene sulphonate, such as dodecyl benzene sulphonate is employed in many embodiments.

Amongst the class of amphoteric surfactants there come into consideration tri alkyl ammonium carboxylate and imidazoline-based fatty acid carboxysulphates, in many case derived from natural products for example coconut carboxy sulphate.

The liquid bleach composition preferably contains deionised water, so as to minimise the extent of decomposition of hydrogen peroxide during storage. As an alternative, that is generally not employed by virtue of its prohibitive cost, distilled water can also be used. The amount of hydrogen peroxide in the liquid bleach is preferably from 5 to 20% and for domestic use often from 5 to 8%, and for industrial use often from 10 to 20% by weight. The hydrogen peroxide can be employed in the form of commercially available concentrated hydrogen peroxide, i.e. having a concentration of at least 30% by weight and often from 35 to 75% by weight which is diluted, stabilised and alkalised to produce the most desired liquid bleach. It will be recognised, therefore, that the composition can contain a small concentration, likely to be in the range of from 5 to 100 ppm, of pyrophosphate. The ethanol can conveniently be employed in the form of methylated spirits, i.e. contain a small fraction of methanol, often from 1 to 5% by weight, based on the ethanol.

The bleach compositions of the present invention can be conveniently formulated by introducing each of the components of the composition sequentially or concurrently into a mixing tank and agitating until a clear liquid occurs. Thus, one suitable method of producing the composition comprises forming an aqueous solution of the surfactants, if any are employed, and the ethanol and the sequestrant at a pH substantially similar to that desired for the final mix, introducing therein sufficient hydrogen peroxide and water to produce a mix having a substantially desired concentration of hydrogen peroxide, and thereafter adjusting the pH of the mix as necessary with an appropriate amount of base. If desired, the surfactant can be predissolved in the ethanol. The preparation can be carried out at ambient temperature or at a sightly elevated temperature, so that it is normally carried out in the range of from 15° to 40° C.

The liquid bleach compositions of the present invention can be employed in conjunction with either solid or liquid detergent compositions. By virtue of the stability of these bleach compositions, they can be mixed with the detergent composition in the dispenser of the washing machine, because the extent of peroxide decomposition in the period after adding the mixture and prior to dissolution in the washing solution is in general insufficiently long to cause marked decomposition of the peroxide. Additionally or alternatively, the liquid bleach composition can be employed in a pre- or a post-wash process, or in each part of a multi-stage washing process. In each of such processes, whether they be pre or during or post washing processes, the concentration of bleach composition introduced into the washing solution is preferably sufficient to generate at least 20 ppm available oxygen (Avox) usually in the range from 20 to 100 ppm Avox. Thus, using a content of 5% hydrogen peroxide in the liquid bleach composition, the latter is preferably employed in an amount of from 0.8 to 4 mls per liter of washing solution. The washing process can be carried out at any temperature from ambient to boiling point of the solution, and especially at a temperature of at least hand-hot, and depending upon local washing customs often from 60° to 95° C. The duration of the washing process is at the discretion of the user, but in many cases will be selected within the range of from 1 to 60 minutes, and frequently from 5 to 30 minutes. In general, the extent of stain removal tends to increase up to at least 30 minutes washing at elevated temperatures.

By virtue of the fact that the hydrogen peroxide is in solution from the start of the washing process, in comparison with solid active oxygen-containing compounds that are otherwise comparable, a faster rate of oxidation of these stains in solution can occur thereby enhancing in particular the washing performance in shorter time programmes.

As an alternative to being employed as an additive in washing domestic clothing and similar items, it can be employed either neat or after dilution absorbed upon a cloth or similar absorbent substance in order to cleanse hard surfaces, for example those made from enamel, paint, metal, plastics, wood, glass or pottery.

Having described the invention in general terms, these embodiments will now be describe more fully by way of example only. Compositions C1, C2, C3, C7, C8, C9, C18, C19, C20, C24 and C25 are present by way of comparison only.

The compositions according to the present invention and the comparison compositions were prepared by the following process and contained the components specified in Table 1 below.

First a concentrated solution of the surfactant was prepared by its solution in a small measured volume of demineralised water at approximately 40° C., and the stabiliser or stabiliser system was then added followed by the ethanol. Hydrogen peroxide and the balance of water was added next, which reduced the solution to approximately ambient temperature followed, last of all by sufficient base to reach the desired pH. Throughout the process, the solution was stirred thoroughly.

In Table 1, the abbreviation TEA represent triethanolamine, EDTA represents ethylene diamine tetra acetate (sodium salt), weight calculated as the salt; EDTPA represents ethylene diamine tetra (methylene phosphonate), hexasodium salt; GLUC represents sodium gluconate; ABS represents a linear alkyl benzene sulphonate available under the trade designation NANSA SS60 from Albright and Wilson, and AEO represents a lower faction primary alkyl ethoxylate having a degree of ethoxylation of 9 and available under the trade name ETHYLAN CD 919 from Diamond Shamrock. The ethanol was employed in the form of methylated spirits, the hydrogen peroxide was employed in the form of an aqueous 35% solution by weight containing pyrophosphate at an approximate concentration of 50 ppm, and the base, either sodium hydroxide or TEA was added in a sufficient amount to produce the pH indicated in the penultimate column of Table 1.

TABLE 1

| Ex No | Oxide | NaOH | TEA | ETOH | EDTA | EDTPA | GLUC | ABS | AEO | pH | % Loss |
|---|---|---|---|---|---|---|---|---|---|---|---|
|  |  |  |  |  |  |  |  |  |  |  | 3wks |
| C1 | 6 | * |  |  | 1 |  |  | 1 |  | 8.0 | 8.6 |
| C2 | 6 | * |  |  | 1 |  |  | 1 |  | 8.5 | 9.1 |
| C3 | 6 | * |  |  | 1 |  |  | 1 |  | 9.0 | 47.6 |
| 4 | 6 | * |  | 10 | 1 |  |  | 1 |  | 8.0 | 2.8 |
| 5 | 6 | * |  | 10 | 1 |  |  | 1 |  | 8.5 | 3.2 |
| 6 | 6 | * |  | 10 | 1 |  |  | 1 |  | 9.0 | 2.9 |
| C7 | 6 | * |  |  |  | 0.27 |  | 1 |  | 8.0 | 4.0 |
| C8 | 6 | * |  |  |  | 0.27 |  | 1 |  | 8.5 | 7.9 |
| C9 | 6 | * |  |  |  | 0.27 |  | 1 |  | 9.0 | 19.4 |
| 10 | 6 | * |  | 10 |  | 0.27 |  | 1 |  | 8.0 | 1.4 |
| 11 | 6 | * |  | 10 |  | 0.27 |  | 1 |  | 8.5 | 3.5 |
| 12 | 6 | * |  | 10 |  | 0.27 |  | 1 |  | 9.0 | 9.1 |
|  |  |  |  |  |  |  |  |  |  |  | 4wks |
| 13 | 6 | * |  | 10 |  | 0.15 | 0.2 | 1 |  | 8.0 | 3.9 |
| 14 | 6 | * |  | 10 |  | 0.15 | 0.2 | 1 |  | 8.5 | 3.1 |
| 15 | 6 | * |  | 10 |  | 0.15 | 0.2 | 1 |  | 9.0 | 3.7 |
| 16 | 6 |  | * | 10 |  | 0.15 | 0.2 | 1 |  | 8.5 | 4.9 |
| 17 | 6 |  | * | 10 |  | 0.15 | 0.2 | 1 |  | 9.0 | 4.7 |
|  |  |  |  |  |  |  |  |  |  |  | 5wks |
| C18 | 6 |  | * |  |  | 0.15 | 0.2 |  |  | 8.5 | 8.7 |
| C19 | 6 |  | * |  |  | 0.15 | 0.2 |  |  | 9.0 | 7.0 |
| C20 | 6 |  | * |  |  | 0.15 | 0.2 |  |  | 9.5 | 12.9 |
| 21 | 6 |  | * | 10 |  | 0.15 | 0.2 |  |  | 8.5 | 7.2 |
| 22 | 6 |  | * | 10 |  | 0.15 | 0.2 |  |  | 9.0 | 5.8 |
| 23 | 6 |  | * | 10 |  | 0.15 | 0.2 |  |  | 9.5 | 6.3 |
| C24 | 6 | * |  |  |  | 0.15 | 0.2 | 2 |  | 8.5 | 6.7 |
| C25 | 6 | * |  |  |  | 0.15 | 0.2 | 2 |  | 9.0 | 12.2 |
| 26 | 6 | * |  | 10 |  | 0.15 | 0.2 | 2 |  | 8.5 | 3.8 |
| 27 | 6 | * |  | 10 |  | 0.15 | 0.2 | 2 |  | 9.0 | 6.8 |

The pH of the bleach composition was measured using a standardised pH electrode and the storage stability of the composition was determined by measuring the available oxygen of the composition before storage and after storage during a predetermined period by the standard acidified potassium permanganate titration, the difference between the two results showing the extent to which oxygen had been lost.

From Table 1, it can be seen that one effect of incorporating ethanol in compositions containing a sequestrant is to significantly improve the long term stability of the composition, indicating that a relatively storage stable alkaline bleach composition can be formulated.

The washing performance of a representative bleach composition, No 15, was determined by washing prestained swatches or prestained cloth at the concentration of 2 gpl in a washing solution containing 1.6 ml per liter of a heavy duty unbuilt liquid detergent available in the USA under the trade name DYNAMO. By way of comparison, the detergent compositions were also employed on the same stains in conjunction with commercial alkaline bleach having the formulation (CLOROX 2). All the washing trials were carried out at 60° C. in water containing 150 ppm hardness calculated as calcium carbonate in a weight ratio of calcium to magnesium of 3:1. The washing trials were carried out in a laboratory scale washing machine available from US Testing Corporation under the name TERGOTOMETER. The extent to which stain was removed from the swatches was determined by measuring the reflectance of the swatch both before and after washing employing a Zeiss ELREPHO reflectance photometer having a xenon lamp equipped with a y-tristimulus filter. Each swatch was measured four times with a backing of three thicknesses of material and the reflectance readings were averaged. The percentage stain removal calculated using the following formula:

Percentage stain removal = $100 \times (R_f - R_i)/(R_u - R_i)$ in which $R_u$ represents the reflectance of unstained cloth, $R_i$ represents the stained cloth reflectance and $R_f$ represent the washed cloth reflectance. Red wine stained swatches were obtained from EMPA, St Gallen, Switzerland and the coffee stained swatches were obtained by padding the appropriate fabric through the coffee solution, partially drying the fabric with a spin dryer and repeating the cycle to a total of three times. The washing results are summarised in Table 2.

TABLE 2

| Detergent | Bleach Composition | Stain | Stain Removal 10 min. wash | (Reflectance) 30 min. wash |
|---|---|---|---|---|
| Dynamo | Comp | Red Wine | 36.9 | 43.6 |
| Dynamo | Ex 15 | Red Wine | 66.6 | 72.7 |
| Dynamo | Comp | Coffee | 57.8 | 63.5 |
| Dynamo | Ex 15 | Coffee | 60.5 | 61.6 |

From Table 2, it can be seen that the washing performance of the detergent plus bleach is broadly comparable on coffee stains employing the liquid bleach of the present invention or the solid comparison bleach, and with the red wine stain the invention bleach achieved a better result than the comparison bleach.

We claim:

1. A liquid bleach composition comprising:
   3% to 20% by weight hydrogen peroxide;
   at least one base in an amount sufficient to render the composition alkaline;
   5% to 20% by weight ethanol;
   a stabilising amount of a substituted amino compound having the formula $R+NR-(CH_2)_p\overline{]_q}-NR_2$ in which p is from 2 to 6, q is from 0 to 2, and R represents an acetate or methylene phosphate group;
   and water.

2. A composition according to claim 1 having an alkaline pH of up to 9.5.

3. A composition according to claim 1 having a pH in the range of from 8 to 9.5.

4. A composition according to claims 1, 2 or 3 wherein said substituted amino compound is substituted by methylene phosphonate groups, and is present in an amount of at least 0.1% by weight.

5. A composition according to claim 4 wherein said substituted amino compound is present in an amount of from 0.1 to 0.4% by weight.

6. A composition according to claims 1, 2 or 3 wherein said amino compound comprises ethylene diamino tetra (methylene phosphonate).

7. A composition according to claim 1 further comprising a linear $C_5$-$C_9$ polyhydroxy carboxylate.

8. A composition according to claim 7 wherein said polyhydroxy carboxylate comprises a gluconate.

9. A composition according to claim 7 or 8 wherein said polyhydroxy carboxylate is present in a weight ratio to the substituted amino compound of from 3:1 to 1:3.

10. A composition according to claim 1 wherein said hydrogen peroxide is present in an amount of from 5 to 8% by weight.

11. A composition according to claim 1 further comprising a surfactant present in an amount of from 0.5 to 2.5% by weight.

12. A composition according to claim 11 wherein said surfactant comprises at least one member selected from the group consisting of an alkyl benzene sulphonate and a non-ionic alcohol exthoxylate.

13. A composition according to claim 3 wherein: said hydrogen peroxide is present in an amount of 5 to 8%; said ethanol is present in an amount of from 5 to 20%; and said substituted amino compound comprises ethylene diamine tetra acetate and is present in an amount of about 1%.

14. A composition according to claim 3 wherein: said hydrogen peroxide is present in an amount of 5 to 8%; said ethanol is present in an amount of from 5 to 20%; said substituted amino compound is present in an amount of about 0.1 to 0.4% and is selected from the group consisting of ethylene diamine tetra methylene phosphonate, hexamethylene diamine tetra methylene phophonate, and diethylene triamine penta methylene phosphonate; and wherein said composition further comprises 0.1 to 0.4% by weight of an alkali metal gluconate.

15. A composition according to claim 14 wherein said gluconate is present in a weight ratio to said phosphonate of 1:1 to 2:1.

16. A process of bleaching comprising contacting an article to be bleached with a composition according to claim 1.

17. A process according to claim 16 wherein said composition is diluted with water prior to said contacting.

18. A process of cleaning comprising contacting an article to be cleaned with a washing composition to which has been added a bleach composition according to claim 1.

* * * * *

UNITED STATES PATENT AND TRADEMARK OFFICE
CERTIFICATE OF CORRECTION

PATENT NO. : 4,347,149

DATED : August 31, 1982

INVENTOR(S) : SMITH ET AL

It is certified that error appears in the above—identified patent and that said Letters Patent is hereby corrected as shown below:

Claim 1, line 9, "phosphate" should read -- phosphonate --.

Signed and Sealed this

Twentieth Day of September 1983

[SEAL]

Attest:

GERALD J. MOSSINGHOFF

Attesting Officer

Commissioner of Patents and Trademarks